(12) United States Patent
Thiyagarajan et al.

(10) Patent No.: US 11,445,392 B2
(45) Date of Patent: Sep. 13, 2022

(54) UNIFIED MANAGEMENT AND MONITORING OF IOT NODES WITH MULTIPLE NETWORK CONNECTIONS

(71) Applicant: Cisco Technology, Inc., San Jose, CA (US)

(72) Inventors: Lakshmi Thiyagarajan, Palo Alto, CA (US); Suvitha Kesavan, San Jose, CA (US); Timothy Peter Stammers, Raleigh, NC (US); Nicholas Butler, San Jose, CA (US); Purval Prakash Shah, Milpitas, CA (US); Rutuja Ravindra Shivde, San Jose, CA (US); Gopal Pralhadrao Jorapur, Mountain House, CA (US); Jinpei Qiang, San Jose, CA (US); Vineet Gupta, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 9 days.

(21) Appl. No.: 17/004,129

(22) Filed: Aug. 27, 2020

(65) Prior Publication Data
US 2022/0070699 A1    Mar. 3, 2022

(51) Int. Cl.
| | |
|---|---|
| *H04W 88/06* | (2009.01) |
| *H04W 24/08* | (2009.01) |
| *H04W 8/20* | (2009.01) |
| *G16Y 30/00* | (2020.01) |
| *H04W 24/10* | (2009.01) |

(52) U.S. Cl.
CPC .......... *H04W 24/08* (2013.01); *H04W 8/205* (2013.01); *G16Y 30/00* (2020.01); *H04W 24/10* (2013.01); *H04W 88/06* (2013.01)

(58) Field of Classification Search
CPC ..... H04W 24/08; H04W 8/205; H04W 88/06; H04W 24/10; G16Y 30/00
See application file for complete search history.

(56) References Cited

U.S. PATENT DOCUMENTS

| | | |
|---|---|---|
| 2012/0029762 A1 | 2/2012 | Ubik et al. |
| 2017/0339617 A1 | 11/2017 | Lei et al. |
| 2017/0353565 A1* | 12/2017 | Kumar .................. H04L 67/125 |

(Continued)

OTHER PUBLICATIONS

Xie et al., A Survey of Machine Learning Techniques Applied to Software Defined Networking (SDN): Research Issues and Challenges, 2019, IEEE Communications Surveys & Tutorials, vol. 21, No. 1, First Quarter 2019 (Year: 2019).*

(Continued)

*Primary Examiner* — Said M Elnoubi
(74) *Attorney, Agent, or Firm* — Behmke Innovation Group LLC; Kenneth J. Heywood; Jonathon P. Western (57) ABSTRACT

In one embodiment, a device receives data regarding a node from a plurality of management platforms, each management platform being associated with a different access network used by the node. The device applies a unified data model to the data regarding the node received from the plurality of management platforms, to form unified data regarding the node. The device analyzes the unified data regarding the node, to generate insight information. The device provides the insight information to an application associated with a manufacturer of the node.

20 Claims, 6 Drawing Sheets

(56) References Cited

U.S. PATENT DOCUMENTS

| | | | | |
|---|---|---|---|---|
| 2018/0047107 | A1 | 2/2018 | Perl et al. | |
| 2018/0270630 | A1* | 9/2018 | Levine | H04M 15/49 |
| 2019/0215670 | A1* | 7/2019 | Ameixieira | H04W 24/08 |
| 2020/0034336 | A1* | 1/2020 | Haddad | G06F 16/9035 |
| 2020/0037130 | A1 | 1/2020 | Mishra | |
| 2020/0336258 | A1* | 10/2020 | Zhu | H04L 43/0835 |
| 2020/0374766 | A1* | 11/2020 | Veloso | H04W 76/16 |
| 2021/0144517 | A1* | 5/2021 | Guim Bernat | H04L 47/781 |
| 2021/0274412 | A1* | 9/2021 | Dowlatkhah | H04W 36/30 |

OTHER PUBLICATIONS

Xie et al., A Survey of Machine Learning Techniques Applied to Software Defined Networking (SDN): Research Issues and Challenges, First Quarter 2019, IEEE Communications Surveys & Tutorials, vol. 21, No. 1. (Year: 2019).*

Davidson, Ken, "Manufacture There, Connect Anywhere: Cisco eSIM Flex Enables Global Connectivity for Enterprises and Service Providers", Jun. 24, 2020, 6 pages, Blogs.Cisco.com.

"Operation and Configuration Guide 2.16.2, AirLink Mobility Manager", Oct. 2018, 184 pages, Sierra Wireless.

"AirLink Mobility Manager Operations Pack Datasheet", Apr. 2019, 2 pages, Sierra Wireless.

Niazi, Haseeb, "Application Velocity 1.0 for Enterprise Applications", Jun. 2011, 95 pages, Cisco Systems, Inc.

"Features", Jul. 2020, 6 pages, Sierra Wireless.

"Advanced M2M SIM Management with NOVA", Jul. 2020, 9 pages, InfiSIM Ltd.

"IoT Platforms: What is a Connectivity Management Platform (CMP)?", Jan. 2020, 7 pages, InfiSIM Ltd.

"Mobile Network Operator", Aug. 2020, 1 page, Wikimedia Foundation, Inc.

"Monitor", Jul. 2020, 14 pages, Sierra Wireless.

"Reporting", Jul. 2020, 9 pages, Sierra Wireless.

"Airlink Management Service Datasheet", Dec. 2018, 3 pages, Sierra Wireless.

"Maingate Connect Datasheet", Aug. 2015, 2 pages, Sierra Wireless.

Leonard, John, "The Difference Between SIM, eSIM & ISIM", Jun. 2019, 8 pages, Nordic Semiconductor.

* cited by examiner

UNIFIED MANAGEMENT AND MONITORING OF IOT NODES WITH MULTIPLE NETWORK CONNECTIONS

TECHNICAL FIELD

The present disclosure relates generally to computer networks, and, more particularly, to unified management and monitoring of Internet of Things (IoT) nodes with multiple network connections.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

In recent years, the management of IoT nodes has also become increasingly complex, with some enterprises now managing millions of IoT nodes at the same time. Indeed, many IoT nodes are now configured to communicate via multiple connectivity types (e.g., Wi-Fi, V2X, cellular, etc.) and across multiple networks (e.g., different cellular providers, etc.). This helps to ensure that an IoT node is able to maintain connectivity under different conditions, such as geographic location, network outages, etc. Thus, the IoT node is able to report its telemetry to a collector, reliably. Autonomous vehicles, for instance, are projected to generate between 1.4 TB and 19 TB per hour of operation. Federal and state laws are also increasingly requiring the storage and analysis of sensor data relevant to an event and to facilitate autonomous data sharing.

In addition to the telemetry data itself, the amount data being transmitted by any IoT node may be of interest. For instance, a vehicle manufacturer may want to track and assess the data usage of each of its vehicles. However, since the data usage may be spread across different connectivity types and networks, this makes it extremely challenging to review and manage assets at the individual vehicle level.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device receives data regarding a node from a plurality of management platforms, each management platform being associated with a different access network used by the node. The device applies a unified data model to the data regarding the node received from the plurality of management platforms, to form unified data regarding the node. The device analyzes the unified data regarding the node, to generate insight information. The device provides the insight information to an application associated with a manufacturer of the node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Figure 1A:
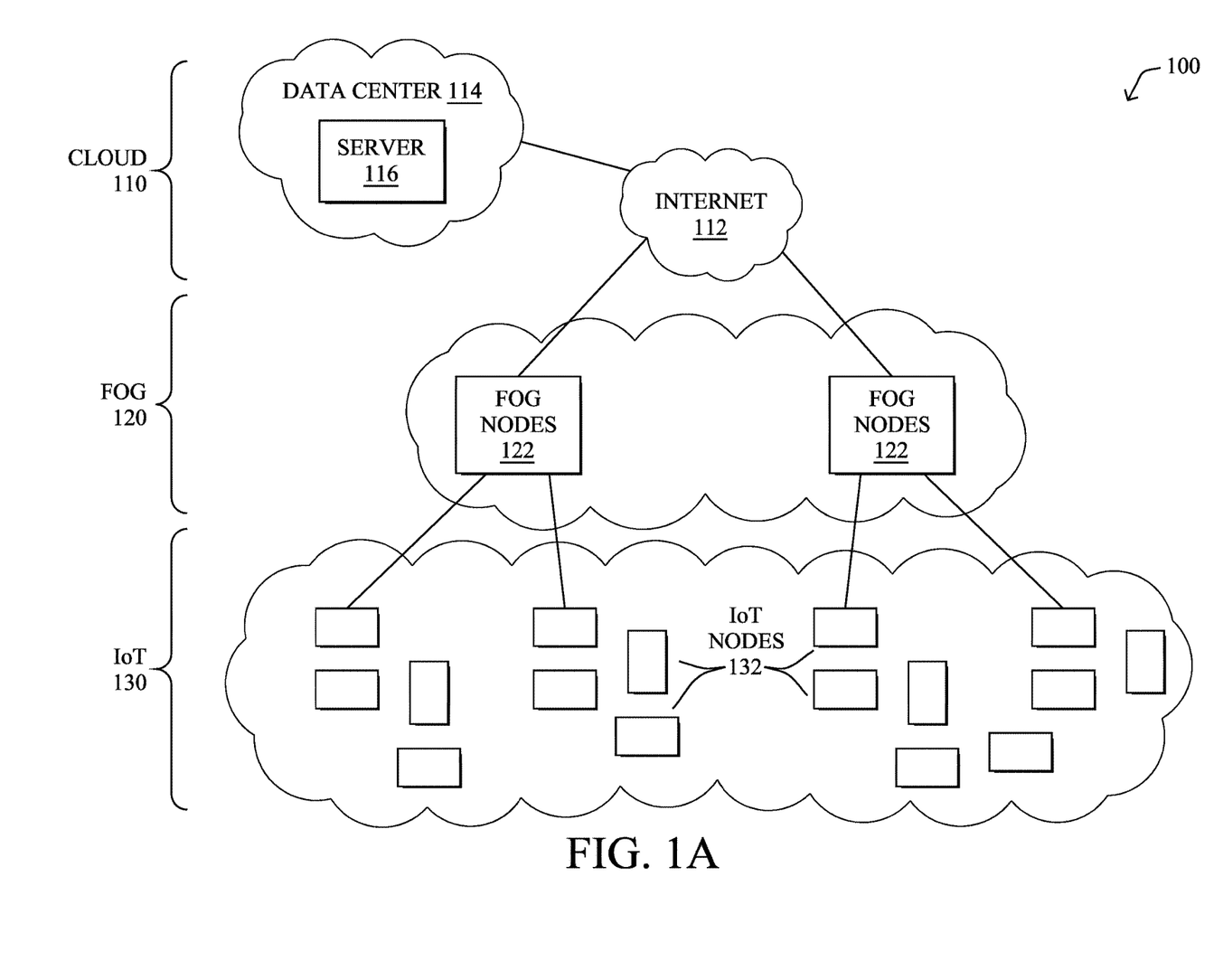
FIGS. 1A-1B illustrate an example communication network.

FIG. 1A is a schematic block diagram of an example simplified communication network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely a cloud layer, a fog layer, and an IoT device/node layer. Illustratively, a cloud layer 110 may comprise general connectivity via the Internet 112, and may include one or more data centers 114 with one or more centralized servers 116 or other devices, as will be appreciated by those skilled in the art. Within the fog layer 120, various fog nodes 122 may execute various fog computing resources on network edge devices, as opposed to datacenter/cloud-based servers or on the endpoint nodes 132 themselves of the IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
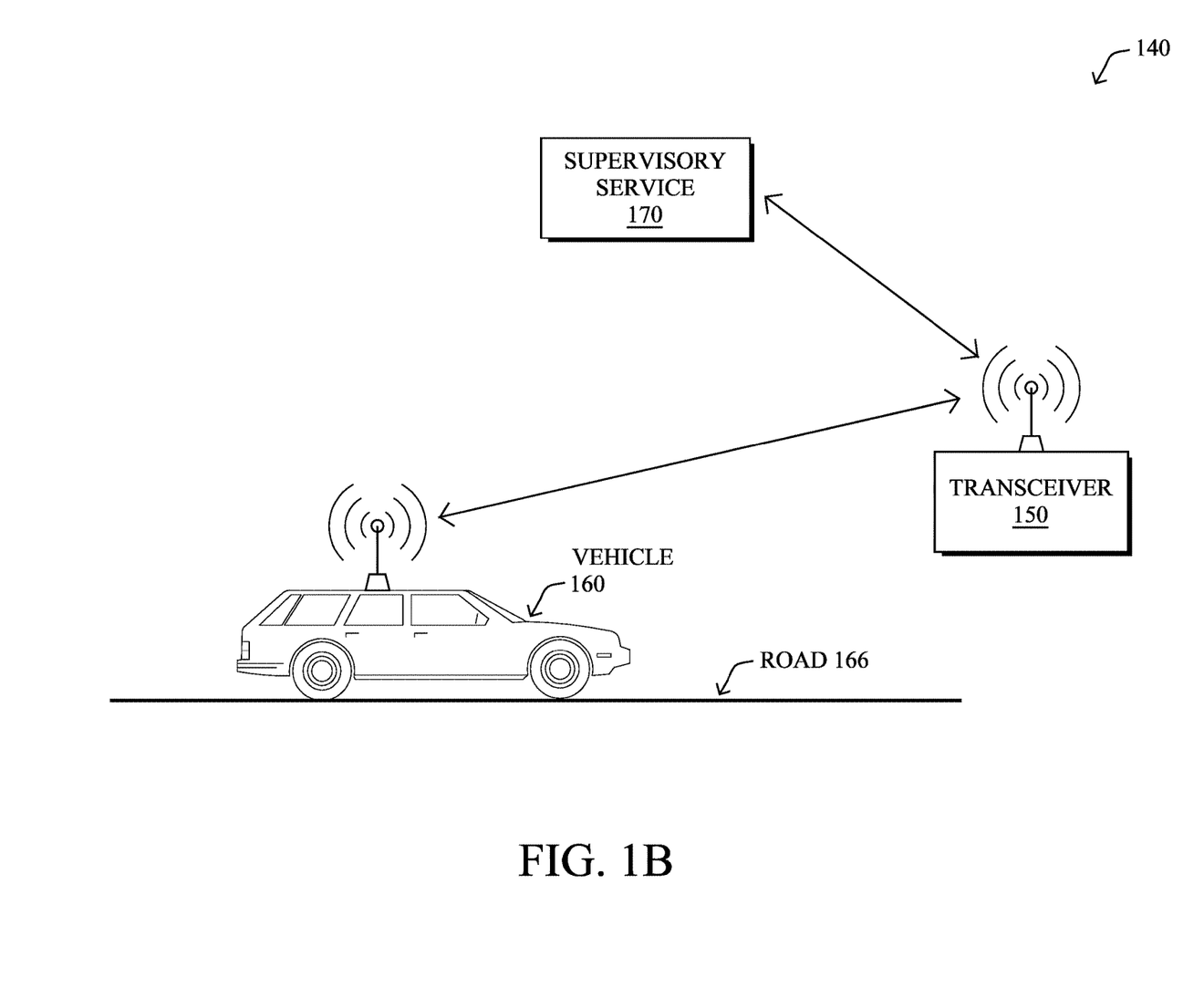

FIG. 1B illustrates an example vehicle communication system 140, according to various embodiments. In particular, vehicle communication system 140 may include any or all of the following components: a vehicle 160, a transceiver 150 (e.g., a cellular tower, a roadside unit, another vehicle, etc.), and/or a remote supervisory service 170. Generally, vehicle 160 may be any form of vehicle configured to move from one physical location to another such as, but not limited to, cars, buses, trucks, boats, trains, aerial vehicles, and the like. In many cases, vehicle 160 may be configured to transport people and/or cargo. Further, vehicle 160 may be an autonomous vehicle, semi-autonomous vehicle, or manually-operated vehicle, according to the various embodiments herein.

In some embodiments, vehicle communication system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, transceiver 150 may be a fog node 122 at fog layer 120, while vehicle 160 may be viewed as an IoT node 132 at IoT device layer 130. Thus, vehicle 160 may communicate directly with transceiver 150, and/or via other IoT nodes 132 (e.g., other vehicles, etc.), and transceiver 150 may provide some degree of processing over the communicated data.

Transceiver 150 may communicate with supervisory service 170 via a WAN, such as the Internet 112 or another WAN. For example, transceiver 150 may communicate with supervisory service 170 by leveraging a hardwired network connection, cellular or other wireless connection, satellite connection, or the like. Communications between vehicle 160 and transceiver 150 may generally be wireless and use any form of known wireless communication (e.g., Wi-Fi, cellular, light-based, etc.). In some implementations, vehicle 160 may include communication equipment that allows vehicle 160 to leverage different network connections, such as different cellular carrier networks, to ensure that vehicle 160 remains connected to supervisory service 170 as it travels.

As would be appreciated, vehicle 160 may comprise its own local network, to allow the various components of vehicle 160 to communicate with one another. For example, vehicle 160 may comprise any number of sub-networks, such as a Controller Area Network (CAN) bus, an IP network, etc., to allow the various systems of vehicle 160 to communicate with one another. Such system may include, but are not limited to, an engine control unit (ECU), a battery management system (BMS) that manages the local battery of vehicle 160, an advanced driver assistance system (ADAS) system, and the like. A local gateway of vehicle 160 may provide communicative connectivity between the local network of vehicle 160 and other devices. For example, the local gateway of vehicle 160 may provide wireless connectivity to transceiver 150 located along road 166 on which vehicle 160 is traveling. In some embodiments, vehicle 160 may also communicate directly with supervisory service 170 via the Internet 112 or another WAN, such as by leveraging a wireless connection to a cellular or satellite-based network.

Figure 2:
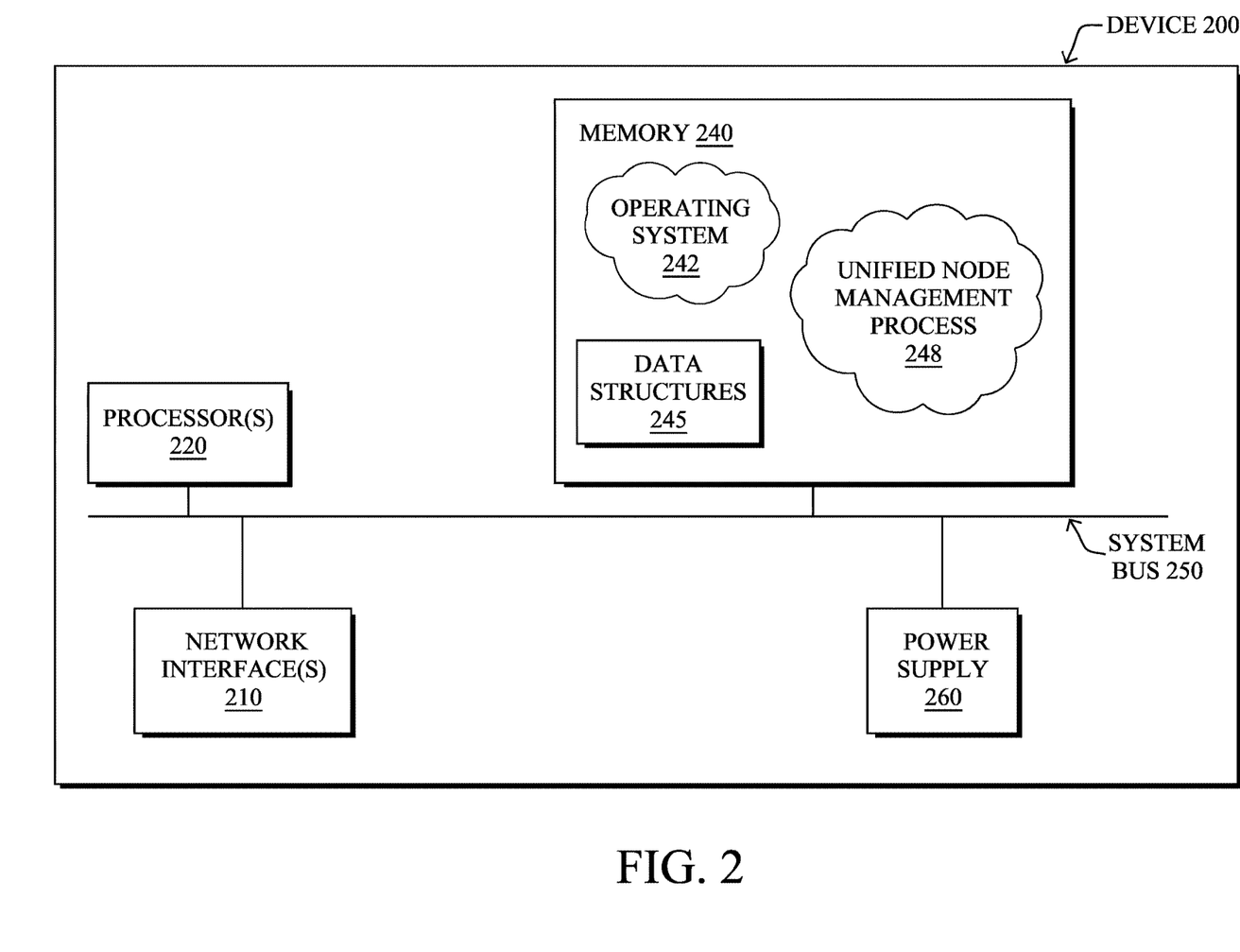
FIG. 2 illustrates an example network device/node.

FIG. 2 is a schematic block diagram of an example computing device 200 (e.g., an apparatus) that may be used with one or more embodiments described herein e.g., as any of the devices shown in FIGS. 1A-1B above (e.g., to provide supervisory service 170, etc.) or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The one or more network interfaces 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections, e.g., wireless and wired/physical connections, and that the view herein is merely for illustration. Also, while the one or more network interfaces 210 are shown separately from power supply 260, for fog modules using PLC, a network interface may communicate through the power supply 260, or may be an integral component of the power supply. In some specific configurations the PLC signal may be coupled to the power line feeding into the power supply.

The memory 240 comprises a plurality of storage locations that are addressable by the processor 220 and the one or more network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative unified node management process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, as detailed further below, unified node management process 248 may also include computer executable instructions that, when executed by processor(s) 220, cause device 200 to perform the techniques described herein. To do so, in some embodiments, unified node management process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, unified node management process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that unified node management process 248 may employ include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly flagged data usage as being abnormal. Conversely, the false negatives of the model may refer to the number of times the model incorrectly flagged data usage as normal. True negatives and positives may refer to the number of times the model correctly predicted whether the data usage was normal or abnormal, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, many IoT nodes (e.g., vehicles, sensors, actuators, etc.) are new capable of communicating via multiple connectivity types and across multiple access networks. For instance, an IoT node may be configured to communicate using Wi-Fi, vehicle-to-vehicle (V2V) communications, vehicle-to-everything (V2X) communications, cellular via one or more subscriber identity modules (SIMs), which may take the form of traditional SIM cards, embedded SIMs (eSIMs), integrated SIMs (iSIMs), etc. (collectively referred to herein as "SIMs"), satellite, combinations thereof, or the like. Similarly, an IoT node may communicate across multiple access networks, such as cellular networks from different providers/mobile network operators (MNOs), satellite networks, land-based networks, etc.

Utilizing multiple connectivity types across multiple access networks helps to ensure that an IoT node is able to maintain connectivity under different conditions, such as geographic location, network outages, etc. Thus, the IoT node is able to report its telemetry to a collector, reliably. For instance, if a vehicle leaves the coverage range of a first cellular network, it may switch to communicating via a second cellular network. Indeed, autonomous vehicles are projected to generate between 1.4 TB and 19 TB per hour of operation, requiring persistent network connectivity. Federal and state laws are also increasingly requiring the storage and analysis of sensor data relevant to an event and to facilitate autonomous data sharing.

In addition to the telemetry data itself, the amount of data being transmitted by any IoT node may be of interest. For instance, an original equipment manufacturer (OEM) of a vehicle may want to track and assess the data usage of each of its vehicles. However, since the data usage may be spread across different connectivity types and networks, this makes it extremely challenging to review and manage assets at the individual vehicle level.

Unified Management & Monitoring of IoT Nodes with Multiple Network Connections The techniques herein introduce an architecture for a unified management and monitoring system for IoT nodes with multiple connectivity types, such as connected vehicles. The unified architecture allows OEMs and other interested parties to manage and monitor the connections, detect anomalous behaviors at the vehicle level, perform diagnostics, segment traffic, automatically select connectivity, and/or perform testing.

Specifically, according to one or more embodiments of the disclosure as described in detail below, a device receives data regarding a node from a plurality of management platforms, each management platform being associated with a different access network used by the node. The device applies a unified data model to the data regarding the node received from the plurality of management platforms, to form unified data regarding the node. The device analyzes the unified data regarding the node, to generate insight information. The device provides the insight information to an application associated with a manufacturer of the node.

Illustratively, the techniques described herein may be performed by hardware, software, and/or firmware, such as in accordance with the unified node management process 248, which may include computer executable instructions executed by the processor 220 (or independent processor of interfaces 210) to perform functions relating to the techniques described herein.

Figure 3:
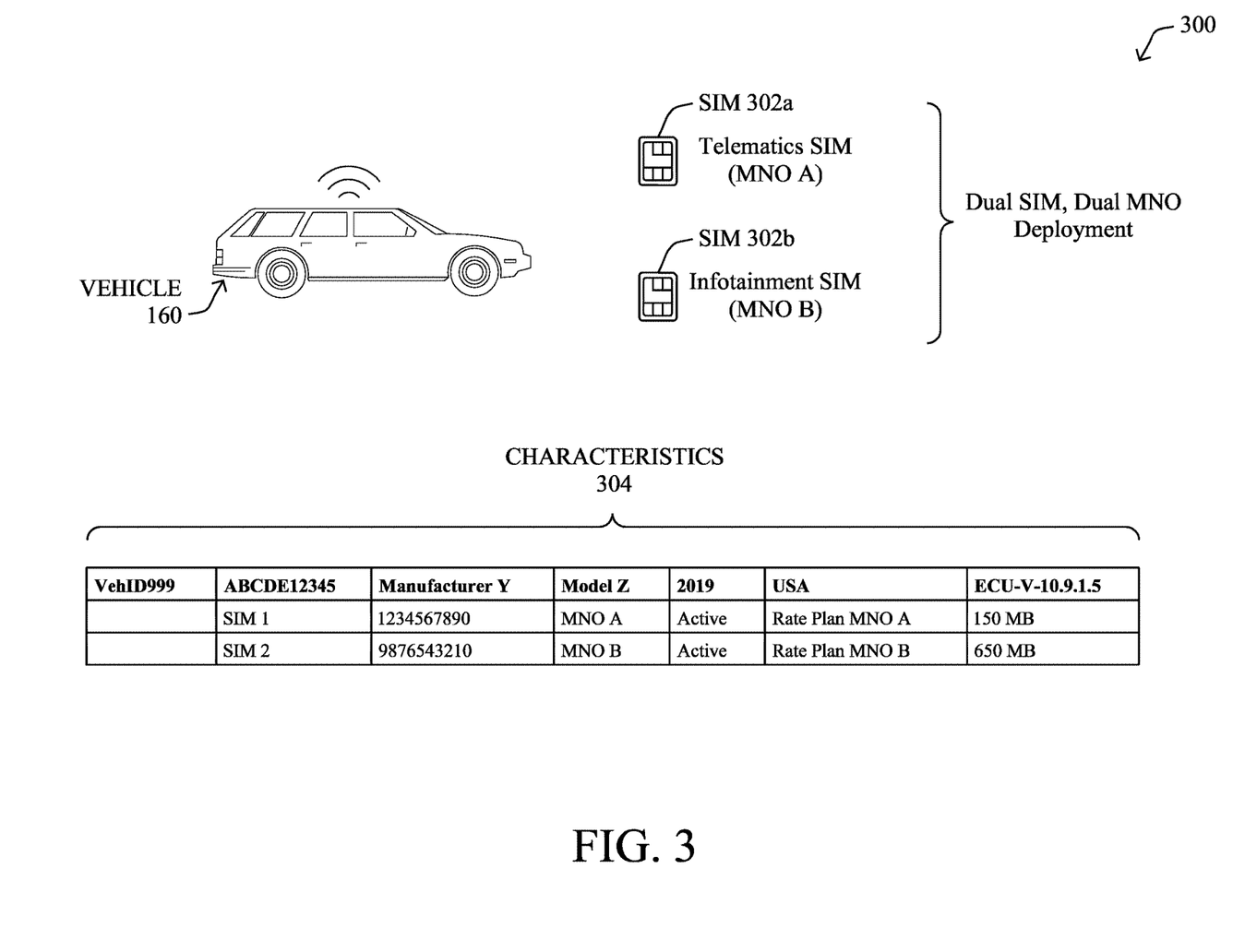
FIG. 3 illustrates an example of a node with multiple network connections.

Operationally, FIG. 3 illustrates an example 300 of vehicle 160, which may employ a dual SIM, dual MNO deployment. More specifically, vehicle 160 may be equipped with two SIMs: 1.) a first SIM 302a that allows vehicle 160 to communicate via a first MNO and 2.) a second SIM 302b that allows vehicle 160 to communicate via a second MNO. For instance, vehicle 160 may use SIM 302a to send and/or receive telematics data, such as from various sensors of vehicle 160 (e.g., LIDAR sensors, temperature sensors, etc.). Conversely, vehicle 160 may use SIM 302b to send and/or receive infotainment data.

As a result of the use of multiple SIMs (e.g., SIMs 304a-304b), there may be a set of characteristics 304 of vehicle 160 spread across the various MNOs utilized by vehicle 160, the OEM of vehicle 160, etc. For instance, vehicle 160 may have a particular identifier (e.g., VehID999), vehicle identification number (VIN) (e.g., ABCDE12345), Manufacturer (e.g., Y), Model (e.g., Z), build year (e.g., 2019), country of origin (e.g., USA), electronic control unit (ECU) version (e.g., ECU-V-10.9.1.5). In addition, each SIM used by vehicle 160 may have its own characteristics. For instance, SIM 302a may have a unique identifier (e.g., 1234567890), be associated with a particular MNO (e.g., MNO A), have an active or inactive state (e.g., Active), operate under a particular rate plan (e.g., Rate Plan MNO A), and have a data limit per cycle (e.g., 150 MB). Similarly, SIM 302b may have a unique identifier (e.g., 9876543210), be associated with a particular MNO (e.g., MNO B), have an active or inactive state (e.g., Active), operate under a particular rate plan (e.g., Rate Plan MNO B), and have a data limit per cycle (e.g., 650 MB).

While many or all of characteristics 304 of vehicle 160 may be known to its OEM or other interested party, further information about vehicle 160. For instance, many MNOs maintain their own connectivity management platforms (CMPs), meaning that information such as data usage is only available to the OEM via these platforms. Thus, a unified monitoring and management view of vehicle 160 is not available, meaning that the OEM must mange each of SIMs 302a-302b individually. In addition, behavioral issues, such as behavioral anomalies, may not be readily identifiable using the information available from any given CMP.

Figure 4:
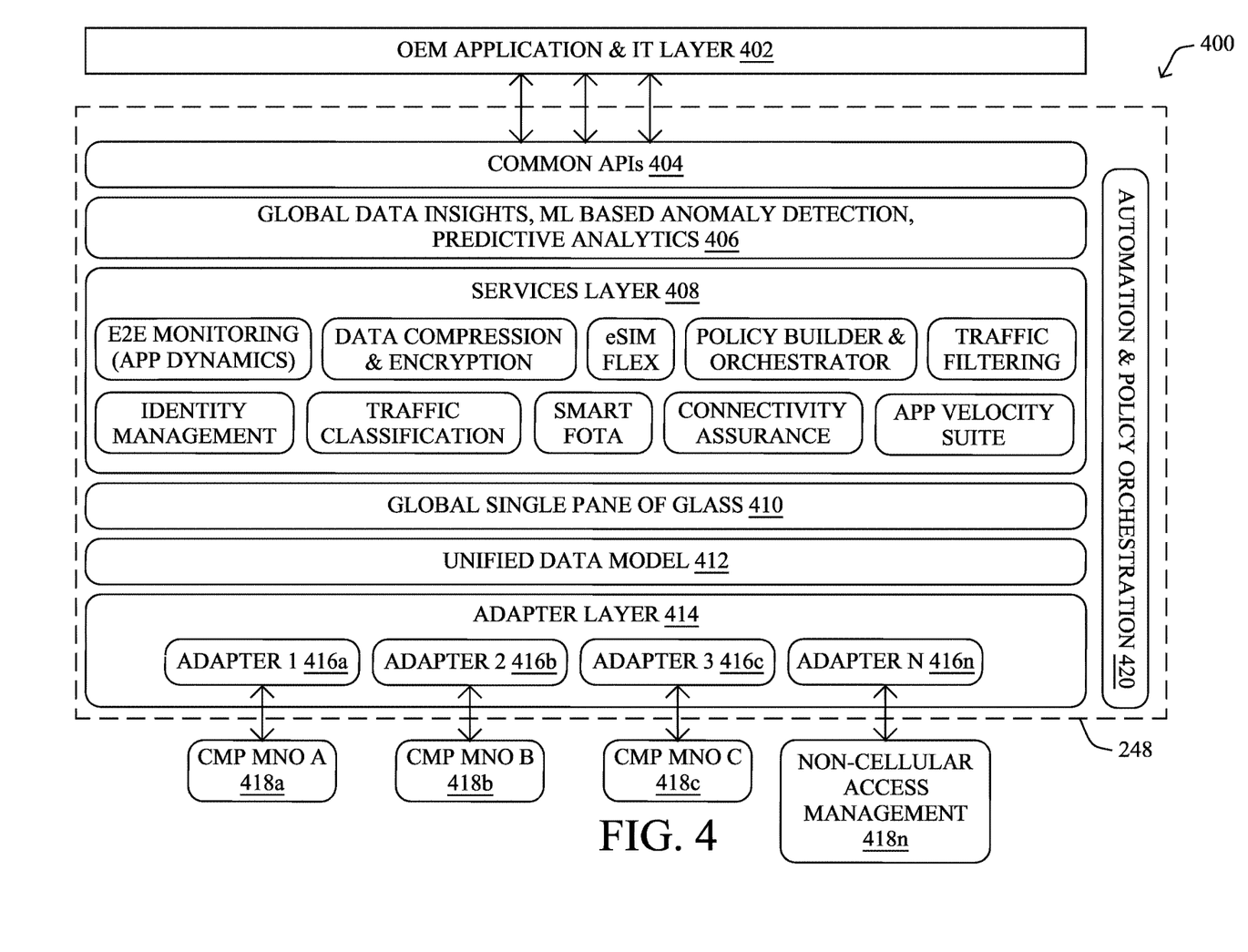
FIG. 4 illustrates an example architecture for unified management and monitoring of a node with multiple network connections.

FIG. 4 illustrates an example architecture 400 for the unified management and monitoring of a node with multiple network connections, according to various embodiments. As shown, architecture 400 may be used to implement unified node management process 248, allowing its executing device (e.g., device 200) to perform the techniques herein. As would be appreciated, architecture 400 may be implemented on a single executing device or in a distributed manner across any number of devices. In the latter case, the combination of executing devices may be viewed as a singular device for purposes of performing the techniques herein.

In general, architecture 400 allows unified node management process 248 to provide a unified management and monitoring service to OEM application and information technology (IT) layer 402, thereby unifying the various management platform 418 associated with the access networks used by the IoT node manufactured by the OEM. For instance, a vehicle manufacturer may maintain its own application for the management of its IoT nodes, but be limited in its ability to pull information from the various providers whose access networks the IoT nodes utilize. To do so, unified node management process 248 may offer a set of common APIs 404, allowing layer 402 at the OEM to communicate with the management service provided by unified node management process 248.

As noted previously, an IoT node may be configured to communicate via multiple connectivity types across multiple access networks. Consequently, information about the node may be spread across multiple management platforms, such as platform 418a (CMP MNO A), platform 418b (CMP MNO B), platform 418c (CMP MNO C), etc., through an $n^{th}$ platform 418n (e.g., a non-cellular access management platform).

To communicate with each of management platforms 418a-418n, architecture 400 may include an adapter layer 414. More specifically, adapter layer 414 may include corresponding adapters 416a, 416b, 416c, through 416n for each of management platforms 418a-418n. Each adapter 416 may allow unified node management process 248 to retrieve data from the corresponding management platform 418 (e.g., by issuing queries, for data regarding the IoT node, etc.) and/or pass instructions to the corresponding management platform 418 (e.g., by changing a configuration for the node, etc.). In some instances, a management platform 418 may push information to adapter layer 414 without a corresponding adapter 416 first issuing a query for the information. Typically, each adapter 416 may be implemented to leverage application programming interfaces (APIs) of the corresponding management platform 418.

By way of example, adapter layer 414 may receive any or all of the following information from the management platforms 418:

Data usage information—e.g., the amount of data transmitted and/or received by the IoT node via the access network associated with the management platform.

Timing information—e.g., timestamp information for the data usage information. In some instances, the data usage information and timing information may be represented as a timeseries.

Rate plan information—e.g., the name of the rate plan provided by the operator of the access network, the amount of data permitted by the plan (e.g., daily, weekly, monthly, or yearly data limit, etc.), whether data overages pricing information, and the like.

Traffic information—e.g., the types of applications associated with the traffic of the IoT node (e.g., telemetry, infotainment, etc.).

Configuration information—e.g., the connectivity type used by the IoT node to communicate via the access network (e.g., an eSIM, etc.), an identifier for the SIM, carrier settings, etc.

According to various embodiments, architecture 400 may also include a unified data model 412 that unified node management process 248 may apply to the data about the IoT node obtained using adapter layer 414. Indeed, each management platform 418 may use different data formats, units of measure, or the like. For instance, one management platform 418 may provide data usage metrics on an hourly scale (e.g., an average of the data usage by the node over a given hour), while another management platform 418 may provide data usage metrics on a daily scale (e.g., the average data usage by the device over a given day). In another example, one management platform 418 may provide data usage metrics for the node in MB, while another management platform 418 may provide data usage metrics for the node in GB or even TB.

In further embodiments, unified node management process 248 may data model 412 to perform any number of data transformations on the data regarding the IoT node obtained via adapter layer 414. For instance, to maintain a unified view of the IoT node, unified node management process 248 may aggregate the data usage metrics regarding the node obtained from the plurality of management platforms 418, compute any number of statistics for the metrics (e.g., distributions, mean, median, max, min, etc.). Example languages that can be used to implement unified data model 412 may include, but are not limited to, the extensible markup language (XML), JavaScript Object Notation, or the like.

Architecture 400 may also include a services layer 408 that applies any number of services to the unified data regarding the node and/or allows for the unified management of management platforms 418 via unified node management process 248, in some embodiments. For instance, as shown, services layer 408 may include any or all of the following services:

eSiM Flex—this service may provide a single, simplified service to integrate service providers to architecture 400 and manage eSIMs used by IoT nodes managed and monitored by unified node management process 248. Indeed, a key advantage of eSIMs is the ability to remotely reprogram them, which can be managed via the eSIM Flex service. For instance, eSIM Flex service may allow a user to active an eSIM EID to their carrier of choice, while allowing the OEM to maintain a separate eIM EID for telematics data.

Smart FOTA—this service may be responsible for managing and sending firmware over the air (FOTA) updates to IoT nodes managed by unified node management process 248. For instance, the Smart FOTA service may identify appropriate times to push firmware updates (e.g., during times of low node usage or transmissions) and schedule firmware updates, accordingly.

App Velocity Suite—this service may provide a suite of utilities to maximize user experience with any application. For instance, this suite may attempt to optimize resource utilization and other network parameters, to ensure that certain application traffic meets its service level agreements (SLAs).

E2E Monitoring—this service may provide end-to-end monitoring of a particular application in terms of its performance. For instance, App Dynamics by Cisco Systems, Inc., or another suitable application performance monitoring (APM) solution, may be used to provide this service.

Data Compression & Encryption—in some instances, this service may be used to compress and/or encrypt information regarding a particular IoT node. This can be performed between unified node management process 248 and an external application (e.g., an OEM application) and/or between unified node management process 248 and any or all of management platforms 418.

Traffic Classification—this service may operate to classify the various types of network traffic sent to, and from, a given IoT node. For instance, this service may seek to identify the applications associated with the traffic, if not already known, their SLAs, and the like.

Policy Builder & Orchestrator—this service may allow a user to define policies for the use of the information obtained regarding a node, such as security policies. In this instance, architecture 400 may include an automation & policy orchestration service 420 that enforces such a policy within architecture 400. For example, one policy may permit or limit access to specific groups/resources within the OEM. In further embodiments, this service may provide network level security policies, as opposed to relying solely on application level access control. In another embodiment, this service may afford an OEM user with the ability to configure and set different data, streams that would span all connectivity units and types for a given IoT node (e.g., by implementing traffic segmentation). This would allow the OEM to understand the total data consumption for a given node, as well as the breakdown of that usage.

Traffic Filtering—this service may apply filtering to traffic from the IoT node. For instance, this service may operate in conjunction with the other services in services layer 408 to apply security policies, perform traffic segmentation, and the like.

Identity Management—this service may operate to provide note identity management across the various IoT nodes and applications that they may use. For instance, this service may take the form of the Identity Services Engine (ISE) by Cisco Systems, Inc., or another similar process. In general, this service may operate to identify individual IoT nodes, allowing various policies to be applied to them, such as traffic segmentation policies, access control policies, and the like.

Connectivity Assurance—this service may generally be responsible for assessing and optimizing the performance of the various connectivity options available to a particular IoT node. Indeed, the general attributes of the network functions of a node may depend on its geographical location, rate plan, etc. In various embodiments, this service may determine the optimal connectivity medium for the node at any given time (e.g., for FOTA, certain types of traffic, etc.), based on factors such as the network congestion at surge hours per provider, location/coverage area of the node, priority of data type to be transferred (e.g., vehicle engine data vs. infotainment data).

In one embodiment, this service may do so by obtaining call detail record (CDR) data (e.g., call set-up, duration of the call, amount of data transferred, etc.) for each IoT node. In turn, in one embodiment, this service may apply machine learning clustering to this data, to label the set {node, timespan, location, priority}. Once this service has collected sufficient datapoints from multiple nodes of the same type and from the same OEM, this service may employ a connectivity switch mechanism that allows the OEM application to switch the node(s) between connectivity mediums, thereby optimizing network performance with reduced data usage and/or cost.

This service may also track and collect the transformation data for real and virtual connectivity units in a uniform way. By applying the machine learning algorithm, the service can learn the historical data and find a pattern for the transformation. In turn, the service can use the learned pattern to predict and recommend the usage of different real and/or virtual connectivity units of the IoT node.

Automated Testing—another potential service at services layer 408 may be a service that allows for the automated testing of the connectivity management across multiple networks for a particular IoT node. In some instances, this service may automate user interface (UI) and/or API features of the connectivity management and allow for the automated validation of the security mechanisms described previously. For instance, this service may automatically validate any metadata provided by an OEM for a new IoT node. In further instances, this automation may also include functional testing, load testing, and/or integration testing across the various OEMs supported by unified node management process 248.

According to various embodiments, architecture 400 may also include an analytics layer 406 that allows unified node management process 248 to perform various analytics on the unified data for the IoT nodes under its management and provide indications of this analysis to the OEM application at layer 402 via common APIs 404.

In one embodiment, analytics layer 406 may assess the unified data for one or more of the IoT nodes, to generate data insights, at the individual node level or even globally. For instance, such insights may relate to roaming between access networks by the node, a trend in data consumption by the node, or a comparison of data consumption by the node to similar nodes, trends or patterns exhibited by nodes located within a certain geographical region, network performance information, or the like.

In another embodiment, analytics layer 406 may apply a machine learning-based anomaly detector to the unified data for a particular node, such as by comparing its behaviors to that of other, similar nodes. For instance, such a model may create a baseline of 'normal' data consumption by analyzing the data usage patterns of a particular type of IoT node from a particular OEM. In turn, this baseline can be used to identify when the data consumption of a given node deviates from this behavior by a statistically significant amount (e.g., through the use of one or more thresholds).

In a further embodiment, analytics layer 406 may also apply predictive analytics to the unified data for the IoT node(s), enabling the connectivity parameters of the nodes to be adjusted, in advance of failures or other issues. For instance, if a given node is predicted to lose connectivity soon with a particular MNO (e.g., based on prior nodes also losing connectivity at a certain location and/or time), this prediction can be used to switch the node to another MNO, proactively. In further cases, these predictions can be used to ensure that the SLAs of the traffic associated with the node are satisfied, by steering the traffic to the most appropriate connectivity types and/or networks.

Accordingly, architecture 400 may be configured to provide any or all of the following benefits:

1. Node-centric connectivity management for multiple connectivity types—For instance, architecture 400 may provide a Vehicle/VIN centric connectivity management SaaS platform to vehicle OEMs, enabling global visibility and control OEMs across one or more connectivity types (e.g., SIMs, eSIMs, Wi-Fi, DSRC/C-V2X, etc.). With a vehicle or other IoT node as the central management entity, architecture 400 may maintain an extensible data model to store and manage OEM specific node metadata (e.g., VIN, year, brand, model, country, lifecycle, ECU IDs, firmware version, etc.).
2. VIN-centric connectivity management across multiple networks architecture 400 may also provide a single pane of glass view for IoT nodes that have connectivity across multiple operator networks and afford connectivity management across global MNO platforms. Connectivity (e.g., voice, SMS, Data, etc.) can be managed across all networks from a single platform, such as cellular (4G/5G), Single/Dual SIMultiple eSIM profiles across MNOs DSRC/C-V2X, etc.
3. eSIM management across telematics and consumer data—architecture 400 may further provide eSIM and traffic filtering capabilities. This may allow an OEM to define data segments (e.g., separating potential data streams such as telematics and autonomous vehicle data from consumer data such as streaming media or navigation). This may also allow a user of the IoT node to activate an eSIM EID to their carrier of choice, while allowing the OEM to maintain a separate eSIM EID for telematics data.
4. Unified diagnostics across connectivity units—architecture 400 may further provide real time visibility into assessment of various health check points, such as rate plan, session info, data usage limit, vehicle state, etc., in a single network or across multiple networks. This may allow an OEM to fix connection issues by providing solutions dynamically over the network, such as increasing data usage limit, changing rate plan, providing ways to add new profiles from different network providers, switching between networks, etc. OEM users may also use the platform provided by architecture 400 to get a unified view of vehicles or other IoT nodes that are connected to various networks and fix various health check issues across networks.
5. Anomaly detection and insights—as noted above, architecture 400 may also provide insights into node connectivity metrics pattern over a period of time. Architecture 400 may also automatically determine and set anomaly detection thresholds, to identify abnormal behaviors. This helps with finding data clusters for better troubleshooting of issues for node connectivity. The resulting insights can also help OEM to improve their solutions, proactively.

6. Access control and network policy enforcement—nodes can be segmented through the identity service of architecture 400 and security policies enforced, to permit/limit access to specific groups/resources within the OEM. Indeed, by centralizing the identity management of the nodes, an OEM can apply security policies that are unique to each node segment to permit/limit access to specific groups/resources within their enterprise.
7. Traffic segmentation—architecture 400 may also allow an OEM user to configure and set different data streams that would span all connectivity units and types for a given vehicle
8. API orchestration—architecture 400 may further provides an OEM user with the ability to quickly integrate with various service providers, IoT platforms, CMPs, various internal OEM systems, and/or other external applications through an API orchestration service. This may be done by offering a unified data model across multiple systems, such as through a drag and drop API workflow builder. Doing so allows an OEM to quickly onboard new APIs and services without custom development work. The API orchestration by architecture 400 may also be augmented with OEM data such as connectivity information and node data, including node lifecycle and connectivity type lifecycle.
9. Auto-selection of connectivity attributes and types—as noted above, architecture 400 may also automatically select and apply the best connectivity medium for a node, such as for particular traffic, FOTA, or across the board.
10. Automated testing—the unified platform of architecture 400 can also automate the testing and validation of metadata, in a manner that can deal with the multi-tenancy of node management users. Indeed, architecture 400 can ensure global visibility for multiple OEMs using different connectivity types and using the APIs that may use dynamically created user and API key for each OEM, allowing architecture 400 to validate the data retrieved from OEMs for accuracy and the correct mapping of fields and format.

Figure 5:
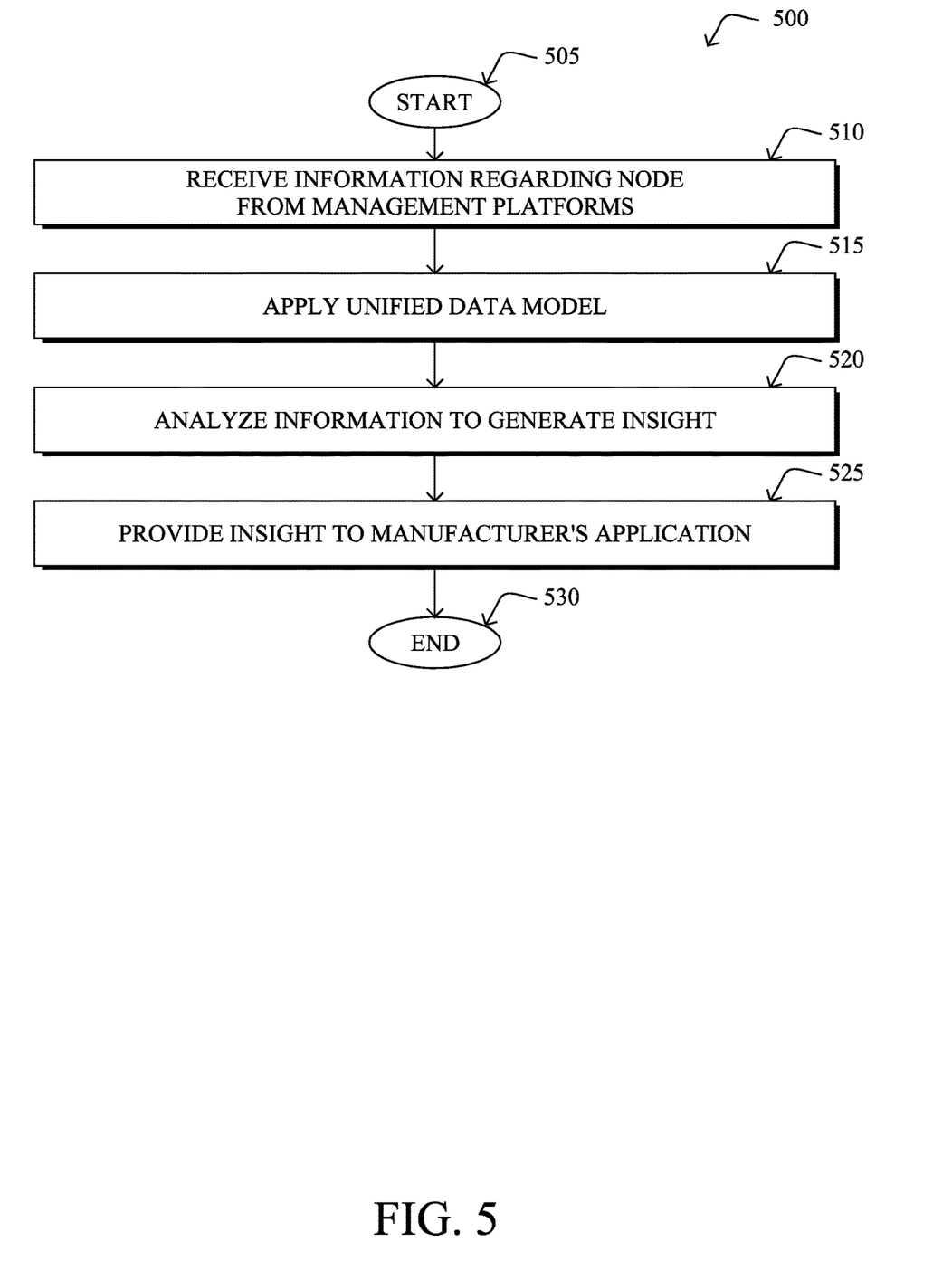
FIG. 5 illustrates an example simplified procedure for the unified management of a node with multiple network connections.

FIG. 5 illustrates an example simplified 500 for the unified management of a node with multiple network connections, in accordance with one or more embodiments described herein. For example, a non-generic, specifically configured device (e.g., device 200) may perform procedure 500 by executing stored instructions (e.g., process 248). The procedure 500 may start at step 505, and continues to step 510, where, as described in greater detail above, the device may receive data regarding a node from a plurality of management platforms. In various embodiments, each management platform may be associated with a different access network used by the node. In one embodiment, the node comprises a vehicle equipped with two or more SIMs via which the vehicle communicates with two or more cellular access networks and the plurality of management platforms comprise two or more management platforms associated with the two or more cellular access network. In a further embodiment, the device receives the data regarding the node from a plurality of management platforms using a corresponding plurality of platform-specific connectors.

At step 515, as detailed above, the device may apply a unified data model to the data regarding the node received from the plurality of management platforms, to form unified data regarding the node. For instance, in one embodiment, the device may aggregate data usage metrics regarding the node from a plurality of management platforms.

At step 520, the device may analyze the unified data regarding the node, to generate insight information, as described in greater detail above. In one embodiment, the device may do so by applying a machine learning-based anomaly detector to the unified data. In another embodiment, the insight may be indicative of at least one of: roaming between access networks by the node, a trend in data consumption by the node, or a comparison of data consumption by the node to similar nodes.

At step 525, as detailed above, the device may provide the insight information to an application associated with a manufacturer of the node. In one embodiment, the device may receive, via the application associated with the manufacturer of the node, an instruction to implement a change for the node comprising at least one of: adjusting a data usage limit of the node, changing a rate plan of the node, or adding a new profile for the node with an access network not previously used by the node. In turn, the device may implement the change for the node via one or more of the plurality of management platforms. In another embodiment, the device may implement traffic segmentation for traffic associated with the node, by sending instructions to the plurality of management platforms. For instance, the device may do so in response to an instruction to do so from the application associated with the manufacturer of the node. In addition, at least a portion of the traffic being segmented may comprises telemetry data generated by the node. In another embodiment, the device may apply clustering to the unified data regarding the node and that of a plurality of other nodes and control network access by the node, based in part on a result of the clustering. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for the unified management and monitoring of IoT nodes with multiple network connections, it is to be understood that various other adaptations and modifications may be made within the intent and scope of the embodiments herein. For example, while specific protocols are used herein for illustrative purposes, other protocols and protocol connectors could be used with the techniques herein, as desired. In addition, while certain anomaly detection models and parameters (e.g., thresholds) are shown, these models may be used on other forms of data and the parameters may be adjusted, as desired. Further, while the techniques herein are described as being performed by certain locations within a network, the techniques herein could also be performed at other locations, such as at one or more locations fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving, at a device, data regarding a node from a plurality of management platforms via a plurality of different adapters corresponding to each one of the plurality of management platforms, each management platform being associated with a different access network used by the node, and at least one of the plurality of management platforms providing data regarding the node in a different format than at least one other of the plurality of management platforms;

applying, by the device, a unified data model to the data regarding the node received from the plurality of management platforms, to form unified data regarding the node;

analyzing, by the device, the unified data regarding the node, to generate insight information; and providing, by the device, the insight information to an application associated with a manufacturer of the node.

2. The method as in claim 1, wherein the node comprises a vehicle equipped with two or more subscriber identification modules (SIMs) via which the vehicle communicates with two or more cellular access networks, and wherein the plurality of management platforms comprise two or more management platforms associated with the two or more cellular access networks.

3. The method as in claim 1, wherein analyzing the unified data regarding the node comprises:

applying a machine learning-based anomaly detector to the unified data.

4. The method as in claim 1, further comprising:

receiving, at the device and via the application associated with the manufacturer of the node, an instruction to implement a change for the node comprising at least one of: adjusting a data usage limit of the node, changing a rate plan of the node, or adding a new profile for the node with an access network not previously used by the node; and implementing the change for the node via one or more of the plurality of management platforms.

5. The method as in claim 1, wherein applying the unified data model to the data regarding the node received from the plurality of management platforms comprises:

aggregating data usage metrics regarding the node from the plurality of management platforms.

6. The method as in claim 1, further comprising:

implementing, by the device, traffic segmentation for traffic associated with the node, by sending instructions to the plurality of management platforms.

7. The method as in claim 6, wherein the device implements traffic segmentation for the traffic associated with the node, in response to an instruction to do so from the application associated with the manufacturer of the node; and wherein at least a portion of the traffic being segmented comprises telemetry data generated by the node.

8. The method as in claim 1, wherein the insight information is indicative of at least one of: roaming between access networks by the node, a trend in data consumption by the node, or a comparison of data consumption by the node to similar nodes.

9. The method as in claim 1, further comprising:

applying clustering to the unified data regarding the node and that of a plurality of other nodes; and controlling network access by the node, based in part on a result of the clustering.

10. The method as in claim 1, wherein the device receives the data regarding the node from a plurality of management platforms using a corresponding plurality of platform-specific connectors.

11. An apparatus, comprising:

one or more network interfaces;

a processor coupled to the one or more network interfaces and configured to execute one or more processes; and a memory configured to store a process that is executable by the processor, the process when executed configured to:

receive data regarding a node from a plurality of management platforms via a plurality of different adapters corresponding to each one of the plurality of management platforms, each management platform being associated with a different access network used by the node, and at least one of the plurality of management platforms providing data regarding the node in a different format than at least one other of the plurality of management platforms;

apply a unified data model to the data regarding the node received from the plurality of management platforms, to form unified data regarding the node;

analyze the unified data regarding the node, to generate insight information; and provide the insight information to an application associated with a manufacturer of the node.

12. The apparatus as in claim 11, wherein the node comprises a vehicle equipped with two or more subscriber identification modules (SIMs) via which the vehicle communicates with two or more cellular access networks, and wherein the plurality of management platforms comprise two or more management platforms associated with the two or more cellular access networks.

13. The apparatus as in claim 11, wherein the apparatus analyzes the unified data regarding the node by:

applying a machine learning-based anomaly detector to the unified data.

14. The apparatus as in claim 11, wherein the process when executed is further configured to:

receive, via the application associated with the manufacturer of the node, an instruction to implement a change for the node comprising at least one of: adjusting a data usage limit of the node, changing a rate plan of the node, or adding a new profile for the node with an access network not previously used by the node; and implement the change for the node via one or more of the plurality of management platforms.

15. The apparatus as in claim 11, wherein the apparatus applies the unified data model to the data regarding the node received from the plurality of management platforms by:

aggregating data usage metrics regarding the node from the plurality of management platforms.

16. The apparatus as in claim 11, wherein the process when executed is further configured to:

implement traffic segmentation for traffic associated with the node, by sending instructions to the plurality of management platforms.

17. The apparatus as in claim 16, wherein the apparatus implements traffic segmentation for the traffic associated with the node, in response to an instruction to do so from the application associated with the manufacturer of the node; and wherein at least a portion of the traffic being segmented comprises telemetry data generated by the node.

18. The apparatus as in claim 11, wherein the insight information is indicative of at least one of: roaming between access networks by the node, a trend in data consumption by the node, or a comparison of data consumption by the node to similar nodes.

19. The apparatus as in claim 11, wherein the process when executed is further configured to:
   apply clustering to the unified data regarding the node and that of a plurality of other nodes; and
   control network access by the node, based in part on a result of the clustering.

20. A computer-readable medium that is tangible, non-transitory, and stores program instructions that cause a device to execute a process comprising:
   receiving, at the device, data regarding a node from a plurality of management platforms via a plurality of different adapters corresponding to each one of the plurality of management platforms, each management platform being associated with a different access network used by the node, and at least one of the plurality of management platforms providing data regarding the node in a different format than at least one other of the plurality of management platforms;
   applying, by the device, a unified data model to the data regarding the node received from the plurality of management platforms, to form unified data regarding the node;
   analyzing, by the device, the unified data regarding the node, to generate insight information; and
   providing, by the device, the insight information to an application associated with a manufacturer of the node.

* * * * *

UNITED STATES PATENT AND TRADEMARK OFFICE
CERTIFICATE OF CORRECTION

PATENT NO. : 11,445,392 B2  
APPLICATION NO. : 17/004129  
DATED : September 13, 2022  
INVENTOR(S) : Lakshmi Thiyagarajan Page 1 of 1

It is certified that error appears in the above-identified patent and that said Letters Patent is hereby corrected as shown below:

In the Specification

Column 1, Line 41, please amend as shown:  
In addition to the telemetry data itself, the amount of data Column 9, Line 36, please amend as shown:  
-cess 248 may use unified data model 412 to perform any number of data Column 10, Line 41, please amend as shown:  
and set different data streams that would span all Column 10, Line 47, please amend as shown:  
Traffic Filtering this service may apply filtering to traffic to and/or Column 12, Line 19, please amend as shown:  
visibility and control for OEMs across one or more con Column 12, Line 20, please amend as shown:  
nectivity types ( e.g., single/dual SIMs, eSIMs , Wi - Fi, DSRC/C Column 12, Line 33, please amend as shown:  
cellular (4G/5G), Single/Dual SIM, Multiple eSIM profiles Column 12, Line 34, please amend as shown:  
across MNOs, Wi-Fi, DSRC/C-V2X, etc.

Signed and Sealed this  
Thirteenth Day of December, 2022

Katherine Kelly Vidal  
*Director of the United States Patent and Trademark Office*